May 25, 1954  C. P. DUFFY  2,679,118
EXCAVATING MACHINE
Filed June 22, 1948  8 Sheets-Sheet 1

Fig. 1.

Cyrus P. Duffy
INVENTOR.

Cyrus P. Duffy
INVENTOR.

May 25, 1954  C. P. DUFFY  2,679,118
EXCAVATING MACHINE
Filed June 22, 1948  8 Sheets-Sheet 4

Cyrus P. Duffy
INVENTOR.

BY Clarence A. O'Brien
and Harvey B. Jacobson
Attorneys

May 25, 1954  C. P. DUFFY  2,679,118
EXCAVATING MACHINE

Filed June 22, 1948  8 Sheets-Sheet 5

Cyrus P. Duffy
INVENTOR.

BY *Clarence A. O'Brien*
*and Harvey B. Jacobson*
Attorneys

May 25, 1954   C. P. DUFFY   2,679,118
EXCAVATING MACHINE
Filed June 22, 1948   8 Sheets-Sheet 8

Cyrus P. Duffy
INVENTOR.

BY

Patented May 25, 1954

2,679,118

UNITED STATES PATENT OFFICE 2,679,118

EXCAVATING MACHINE

Cyrus P. Duffy, Brooklyn, N. Y.

Application June 22, 1948, Serial No. 34,491

27 Claims. (Cl. 37—4)

This invention comprises novel and useful improvements in an excavating machine and more specifically pertains to a power-operated excavating shovel for automatically performing excavating and digging operations and earth moving in general.

The principal object of this invention is to provide a light weight, mobile, and efficient excavator suitable for use in excavating basements, in grading and road making, and earth moving operations in general.

A further important object of the invention is to provide an excavating apparatus which shall be automatic in its operation for removing earth across the full face of the cut as well as progressively advancing into the face of its cut without requiring attention of the operator.

A still further important object of the invention is to provide an automatic excavating device as set forth in the preceding objects which is inherently capable of adjusting itself to various obstructions in its path without injury to itself and without interruption of its digging operation.

These together with other objects of the invention are attained by the apparatus to be hereinafter set forth and an important feature of this invention resides in providing an excavating shovel having a reciprocating or upward and downward motion for penetrating the earth to be excavated, in conjunction with means to impart a lateral or backward motion to the shovel for throwing the earth so removed into a receptable.

A further important feature of the invention resides in the provision of safety means for protecting the apparatus from excessive strain when the shovel encounters stones or other obstacles too great to be removed by the normal stroke of the shovel, and wherein the safety means is so devised as to not interfere with further operation of the shovel, and wherein the shovel automatically adjusts its stroke to that for which it has been originally set after the obstruction has been removed.

An additional important feature of the invention resides in the provision of a mechanism for moving the shovel from side to side during its excavating operation, in order to evenly cover the entire face of the cut made by the shovel.

Yet another important feature of the invention resides in the provision of a mechanism for effectively and easily raising and lowering the shovel's scope of operation in order to compensate for irregularities in the surface of the ground over which the device moves during its excavating operation, and in order to excavate upon various inclines with respect to the horizontal plane.

An additional important feature of the invention resides in the provision of an improved mechanism for starting and stopping the operation of the shovel.

These, together with various ancillary features and objects of the invention, which will later become apparent as the following description proceeds, are attained by this device, a preferred embodiment of which has been illustrated by way of example only in the accompanying drawings, wherein:

A satisfactory embodiment for carrying out the principles of this invention includes a mobile, self-powered supporting frame upon which the various elements of the invention are mounted; an excavating scoop including its supporting structure, its operating means, and vertical and lateral adjusting mechanism; safety release mechanism for preventing damage to the shovel or its various operating and adjusting mechanisms when the shovel encounters an obstruction during the course of its operation; automatic control mechanism for synchronizing the lateral or traversing movement of the shovel during its forward progress into the excavation.

The basic principle of operation of this power shovel is the close simulation of the motion of the scoop to that of a manually operated shovel, consisting of a vertical digging movement combined with a quick, rearward scooping or throwing movement for discharging the earth loosened by the digging movement of the shovel. By reason of the simple path of movement of the shovel, its cycle of operation may be carried out very rapidly at about sixty cycles or strokes per minute, whereby a relatively greater amount of earth may be excavated and moved as compared with much larger conventional type of power shovels.

*Mobile supporting framework of the excavating machine*

Figure 1:
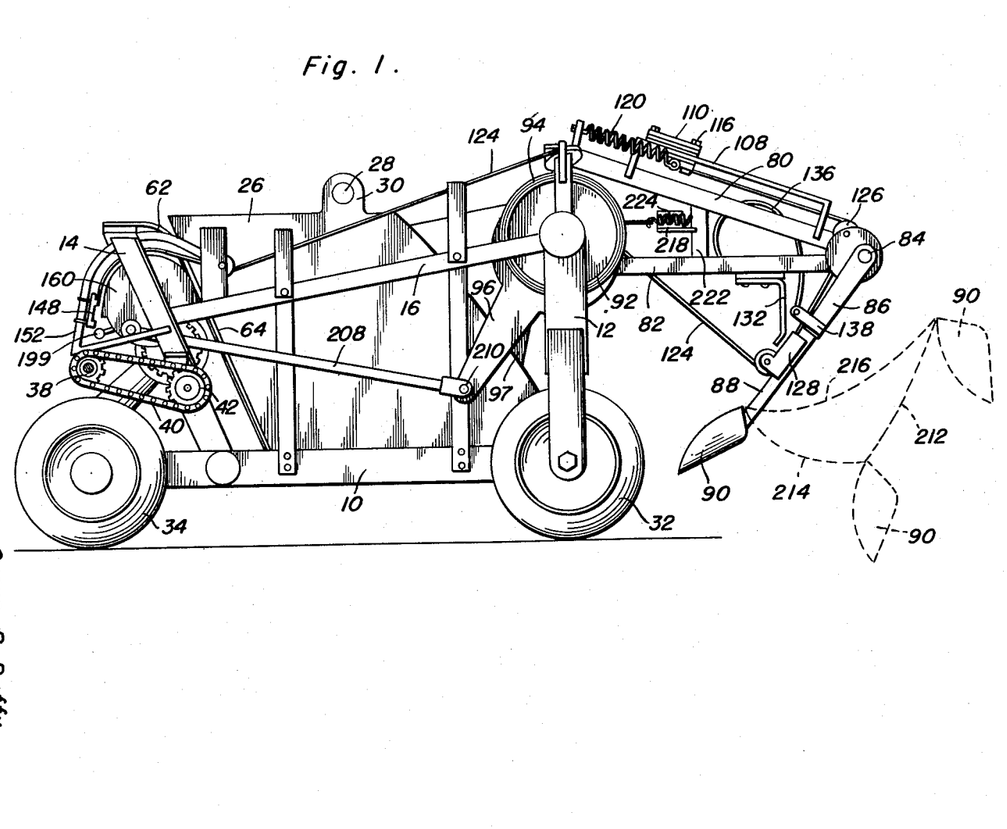
Figure 1 is a side elevational view of one suitable embodiment of the invention, successive positions of the shovel during its digging operation being indicated in dotted lines.
Figure 2:
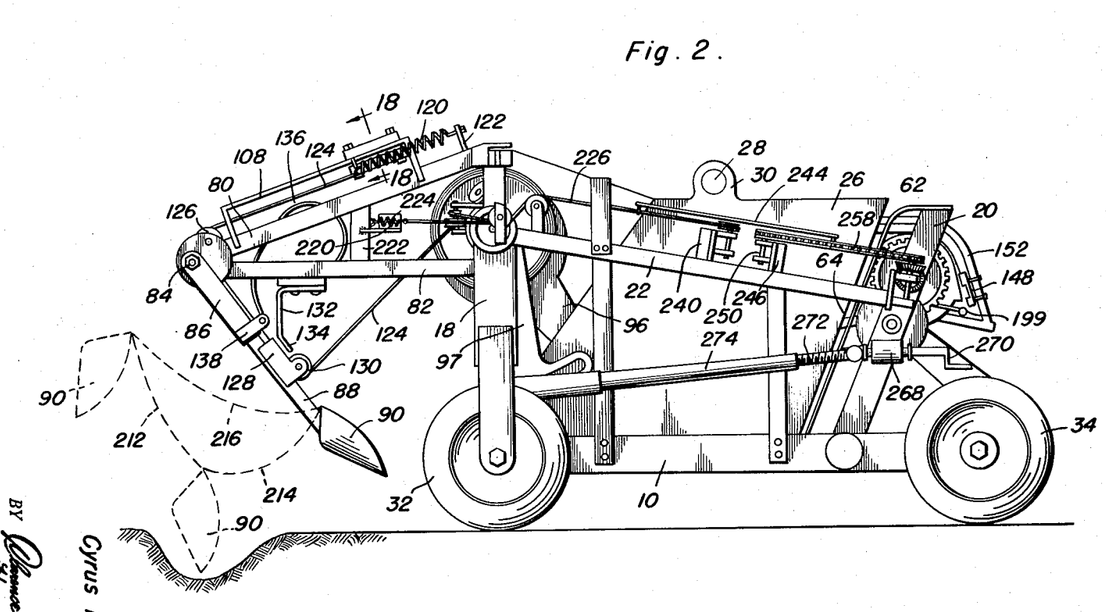
Figure 2 is a side elevational view, taken from the other side of Figure 1, successive positions of the digging operation of the device being indicated in dotted lines.
Figure 3:
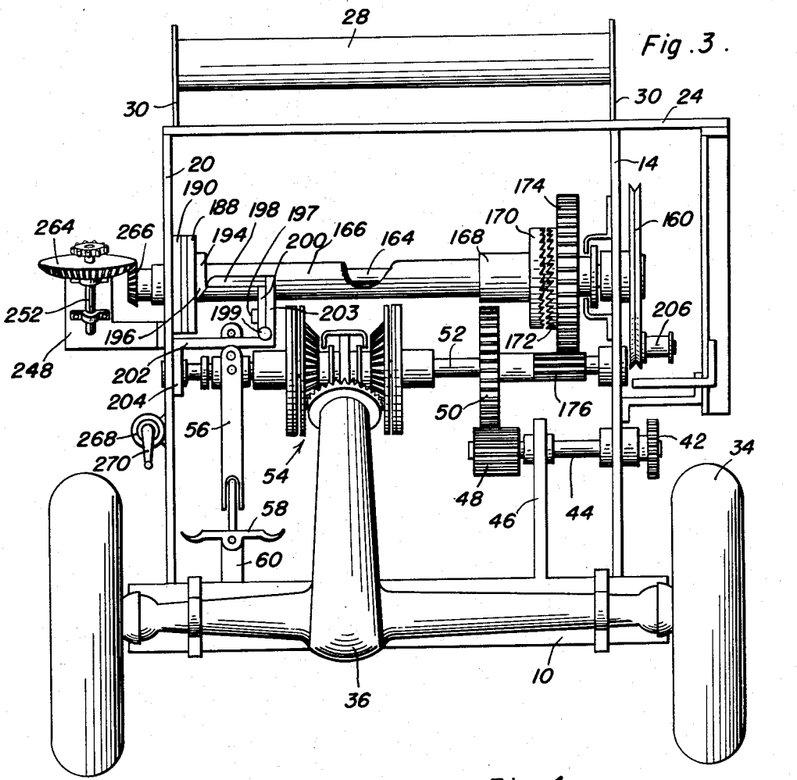
Figure 3 is a rear elevational view of the apparatus of Figures 1 and 2.

As shown best in Figures 1-4, the excavating machine includes a mobile framework having a generally rectangular base platform 10, upon the right and left sides of which are mounted front and rear corner posts 12 and 14 on the right side, connected at their upper ends by a top bar 16 and front and rear posts 18 and 20 upon the left side which are likewise connected by a longitudinally extending top bar 22, the right and left rear posts 14 and 20 being connected by a transverse upper reinforcing bar 24 which overhangs the post 14, as shown in Figure 3, for a purpose to be later set forth.

Vertically slidable into and from the side and end wall constructions of the framework is a receptacle 26 having a transverse supporting handle 28 seated in upwardly extending receptacle handle lugs 30. By means of this handle, the receptacle is vertically removed from or positioned within the framework of the machine resting upon the base 10, and it is intended that any suitable mechanism shall be provided for raising and dumping the receptacle, or returning the same to the position shown in Figures 1 and 2, in which position the front end of the receptacle which is open is appropriately positioned to receive the dirt or other material thrown therein by the shovel of the apparatus.

The supporting framework 10 is provided with front wheels 32 and rear wheels 34, although it will be understood that endless tracks or other wheel substitutes may be provided for lending mobility to the apparatus, and it is preferred that the rear wheels shall be appropriately operated for driving and steering the apparatus.

The actual wheel construction and its operating and steering means does not in itself form any part of this invention, and it will be readily perceived that any suitable mechanism may be provided for this purpose. One such satisfactory mechanism has been diagrammatically indicated in Figure 3 as including a differential housing 36 provided with an irreversible gearing connecting the axle to which the rear wheels 34 are attached, such as a worm drive or the like, such gearing being of known design and not shown.

As will be readily seen from Figures 1-3, a sprocket gear 38 is provided which is to be connected with any suitable power source for imparting mobility to the apparatus, operating the various elements thereof, such power source being, for example, a gasoline engine, not shown. Connected with the sprocket driving gear 38 is a sprocket drive chain 40 which delivers the power from the gear 38 to a driven gear 42, which, as shown best in Figure 3, is carried by one end of a counter-shaft 44 which is journaled in the corner post frame member 14 and in a standard 46 rising from the base 10. The driven sprocket gear 42 is carried by the end of the counter-shaft 44 which extends beyond the corner post 14, while the other end of the shaft extending inwardly of the standard 46 is provided with a counter-shaft gear 48. The latter is constantly in mesh with a driven gear 50 on an intermediate power shaft 52 constituting a spindle, which intermediate spindle is journaled in the members 14 and 20. A suitable reversing gearing indicated generally by the numeral 54 is provided whereby the constant rotation of the spindle 52 may be appropriately imparted to the differential mechanism 36 for selectively causing rotation of the rear wheels 34 in either direction.

A reversing lever 56 is suitably connected to the reversing gearing 54 and is operated by an oscillating foot lever 58 pivoted to a standard 60 rising from the frame 10. Thus, a pedal operated means is provided for selectively causing the intermediate spindle to actuate the differential gearing 36 and the rear wheels 34 in a direction to move the machine forward or rearward as desired, or for putting the gearing in a neutral position.

As will be apparent by reference to Figures 1 and 2, the rear transverse bar 24 has affixed thereto inwardly and downwardly sloping guide members 62 which serve as a guide and a positioning means for receiving and placing the receptacle 26 as the latter is lowered into the side wall construction upon the supporting base 10. As will be readily seen, the rear end of the receptacle 26 has an inwardly and downwardly sloping wall 64 which rests against the guide members 62.

*Excavating shovel*

Figure 4:
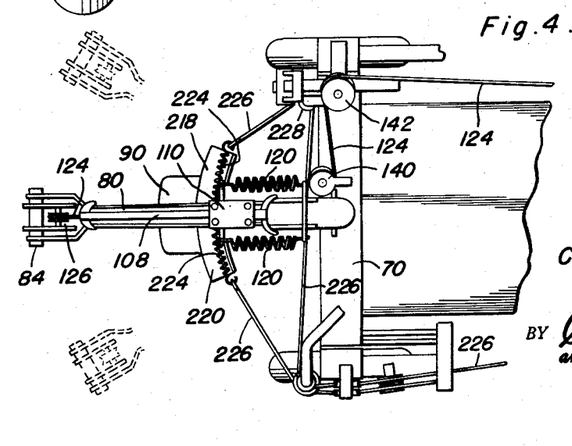
Figure 4 is a fragmentary top plan view of the apparatus of Figures 1-3, alternative positions of the laterally adjustable shovel mechanism being indicated in dotted lines therein.
Figure 10:
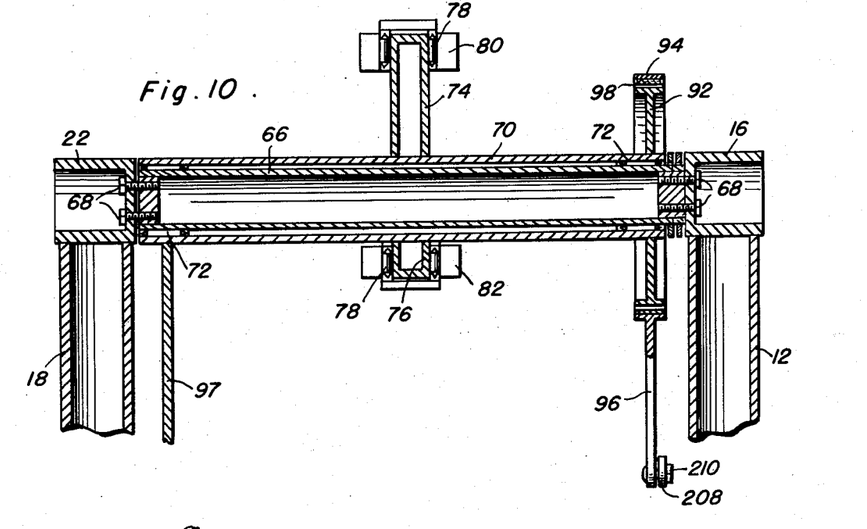
Figure 10 is a fragmentary vertical transverse sectional view through a portion of the mounting mechanism of the shovel.

As will be seen best by reference to Figure 10, and also by reference to Figures 1, 2, and 4, the two front posts 12 and 18 and the top bars 16 and 22 thereon rigidly support therebetween the oscillating boom structure of the shovel mechanism. For this purpose, a preferably tubular axle 66 is secured between the members 16 and 22, as by means of fastening bolts 68, and a tubular actuator tube 70 is oscillatably journaled upon the axle 66, as by means of anti-friction bearings 72 adjacent the ends thereof. From the midpoint of the actuator tube 70 extend upper and lower, diametrically disposed radial boom trunnions 74 and 76, respectively. Anti-friction bearings 78 are mounted on the radially outward ends of these trunnions for rotatably journaling and securing thereon the inner extremities of the upper and lower boom members 80 and 82, respectively. As will be apparent from the various figures of the drawings, the upper and lower boom members form a triangular boom, their outer ends being pivotally connected to each other and to a shovel member, as set forth hereinafter, whereby the triangular boom and the shovel depending therefrom may be readily moved in a vertical plane by oscillating the actuator tube 70, and may be moved in a plane perpendicular to the vertical plane by means of the trunnion bearings 78, as set forth hereinafter.

Referring now more particularly to Figure 4, it will be seen that a pivot pin 84 connects the bifurcated ends of the members 80 and 82 and also pivotally connects therewith a shovel handle support member 86, see Figures 1, 2, 5–7, which handle support detachably receives a shovel handle 88 therein, provided with a scoop or shovel blade 90. As will be readily understood, it is contemplated that the shovel blade and handle may be readily removed from the handle support in order to service the same, or substitute a different shovel and handle having altered operating characteristics, as desired.

Referring now more particularly to Figure 10, it will be seen that the actuator tube 70 adjacent one end thereof, and inside the top bar 16, has rigidly attached and mounted thereon a friction drum 92 secured in any suitable manner, and provided with a peripheral, annular surface embraced and engaged by an annular friction band 94 having an actuator arm 96 thereon. It is to be noted that the oscillation of the actuator tube 70 is effected by means of the actuator arm 96 through the frictional but yieldable gripping engagement of the band 94 on the drum 92, in a manner to be set forth and for a purpose which will later become apparent.

At its other extremity, the actuator tube 70 is provided with a downwardly extending, rigidly attached elevator arm 97 whose construction and mode of operation will later become apparent.

Figures 7, 8, 9, 13, 14:
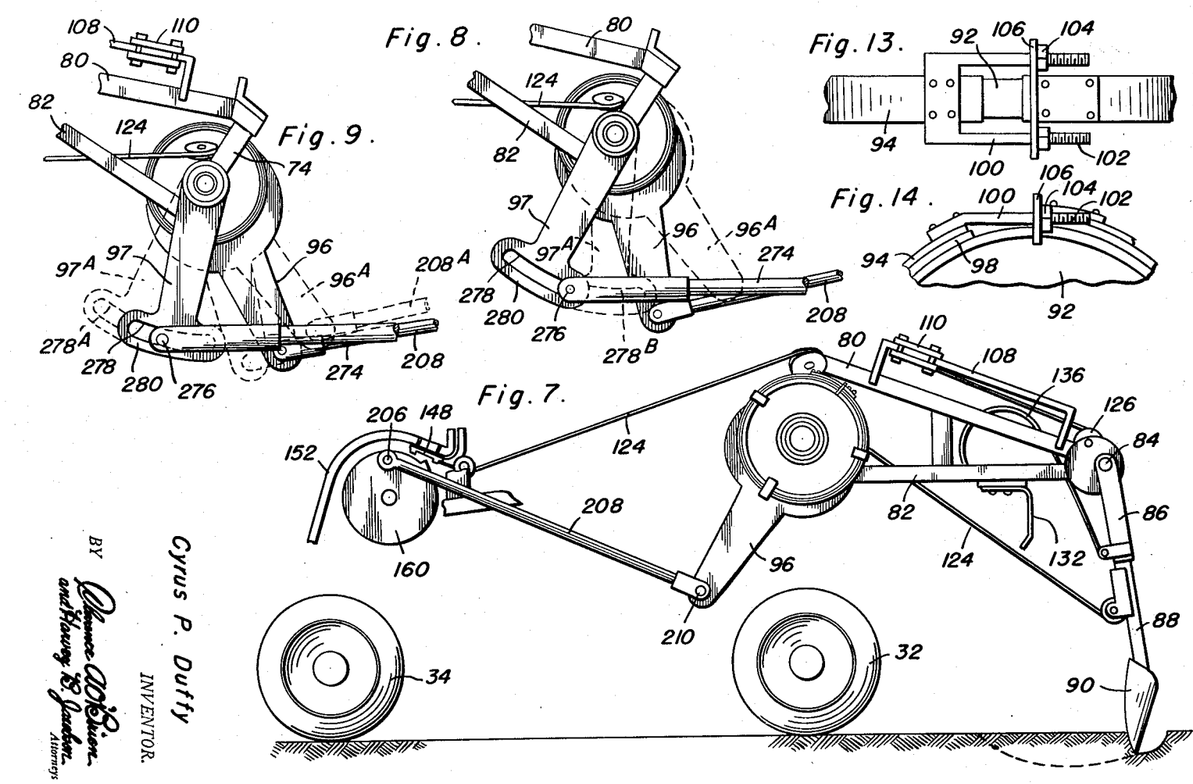
Figure 7 is a view similar to Figures 5 and 6 but illustrating in greater detail and diagrammatically the essential elements of the mechanism for causing the excavating stroke of the shovel and its dirt throwing movement.
Figures 8 and 9 are diagrammatic views indicating various positions in the operation of the stroke-effecting mechanism of the shovel, and in particular indicating the manner in which the device adjusts itself to compensate for obstacles in its path of travel.
Figure 13 is a fragmentary plan view of a portion of a friction brake of the invention.
Figure 14 is a fragmentary side elevational view of the mechanism shown in Figure 13.

Referring now more particularly to Figures 13 and 14, it will be evident that the annular friction band 94 is provided with a brake lining 98 of any suitable type for providing a frictional and gripping engagement between the band and drum. One of the adjacent ends of the annular friction band 94 has rigidly attached thereto a forked, generally U-shaped end member having parallel arms 100 which terminate in screw-threaded extremities 102 and are provided with adjusting nuts 104 for adjustably clamping upon these arms a lug 106 rigidly carried by the other end of the band 94. As will be apparent, it is merely necessary to suitably adjust the nuts 104 to impart any desired tension to the band 94, and thereby vary the frictional gripping engagement to the lining 98 with the friction drum 92.

Figures 11, 18:
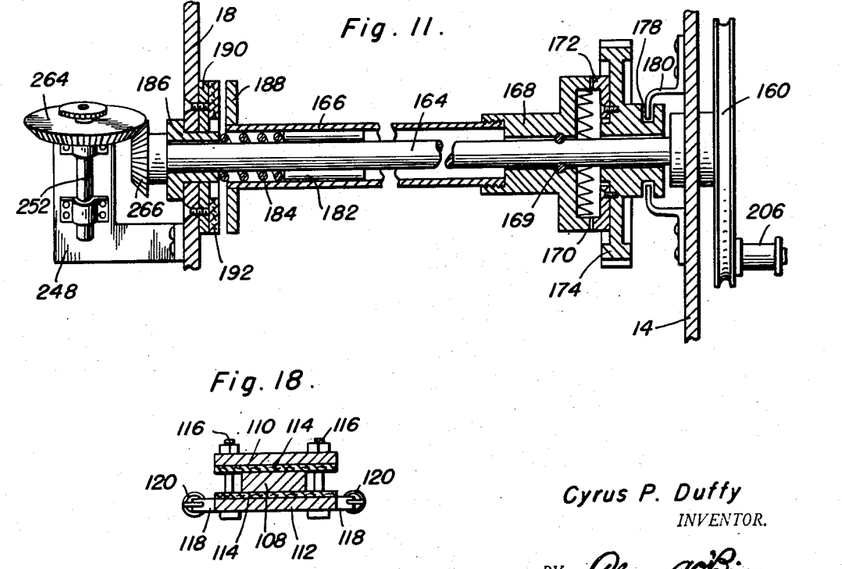
Figure 11 is a fragmentary vertical transverse sectional detail view taken upon an enlarged scale, parts being broken away, of a portion of the clutch and control mechanism for the shovel.
Figure 18 is a fragmentary vertical transverse sectional detail view taken substantially upon the plane of the section line 18—18 of Figure 2, and showing a friction slide forming a safety device of the invention.

Attention is next directed to Figures 1, 2 and 7, and more particularly to Figure 18, wherein it will be seen that the upper boom member 80 is suitably mounted thereabove in a generally parallel relation thereto, a friction bar or guide 108 which is slidably engaged by a friction slide consisting of an upper plate 110 and a lower plate 112 which are provided with friction linings 114 for frictionally gripping and embracing the upper and lower surfaces of the guide bar 108 therebetween, suitable clamping bolts 116 being provided for imparting any desired frictional gripping action to the slide upon the friction bar. Laterally extending lugs 118 are provided at one end of the slide for the attachment thereto of tension springs 120 which tension springs are secured at their other extremities to suitable spring anchors 122 mounted upon the upper boom member 80.

A shovel actuating cable 124 is suitably attached to the slide, as, for example, to the lower surface of plate 112 at the center thereof and is then entrained over a guide pulley 126 mounted on the outer end of the upper boom member 80, this cable being then extended through a hollow guide housing 128 suitably attached to the shovel handle 88, and thence is entrained over a guide pulley 130 mounted in the guide housing 128.

A resilient, angulated bumper spring 132, which may be of leaf spring construction, is secured to the lower surface of the lower boom member 82, and is provided with an abutment surface 134 at one extremity thereof, disposed in such position as to be engaged by the housing 128 to constitute a resilient stop or abutment for limiting the upward movement of the shovel handle 88, as set forth hereinafter. A further leaf spring 136 is secured to the upper surface of the lower boom member 82, and has its extremity pivotally connected, as by a clamp 138, to the shovel handle support 86, in such manner as to yieldingly urge the shovel, shovel handle, and shovel handle support to their normal outermost position in readiness for the next operating stroke of the shovel.

Figure 5:
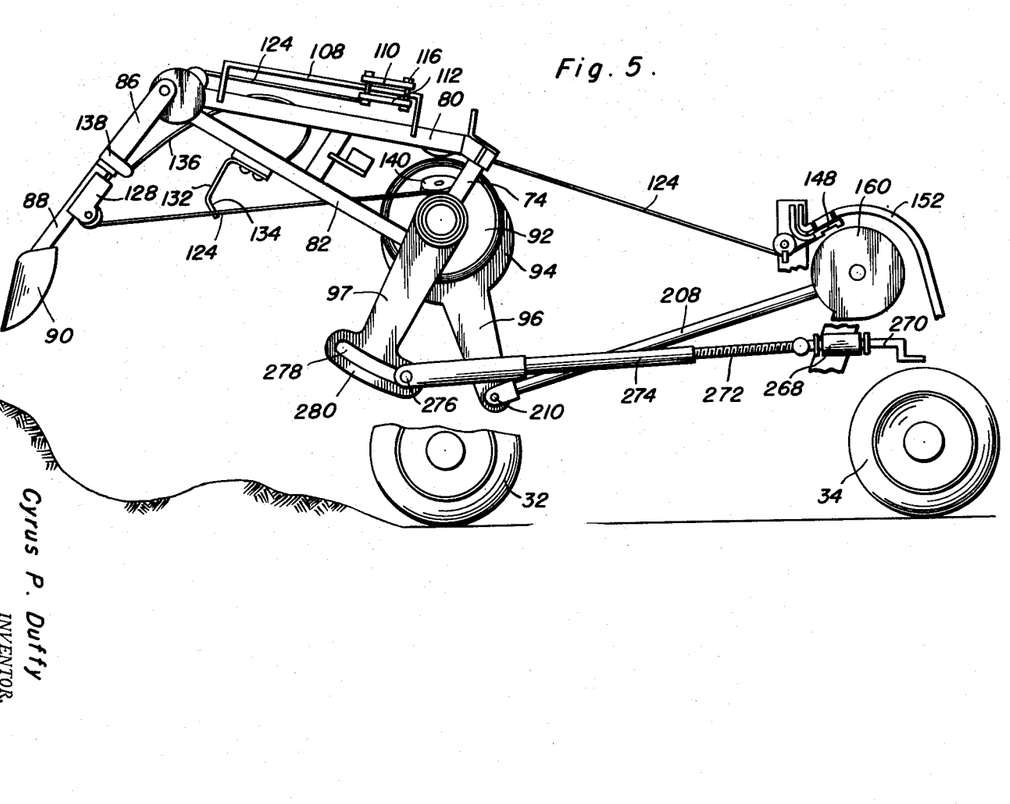
Figure 5 is a diagrammatic side elevational view illustrating the adjustment of the shovel operating mechanism, the same being indicated in its most elevated position of adjustment.
Figure 6:
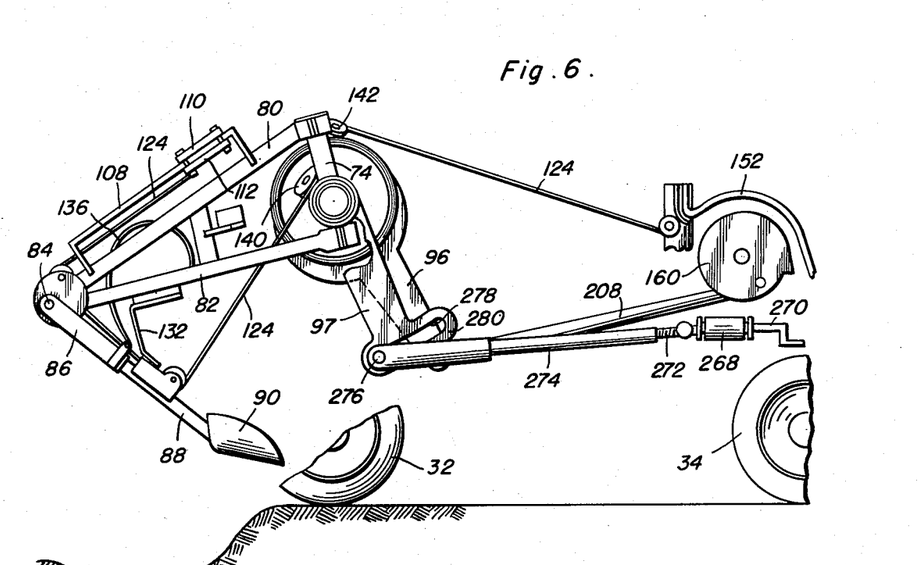
Figure 6 is a view similar to Figure 5 but indicating the position of the mechanism in its most depressed or lowered position of adjustment for digging.
Figure 12:
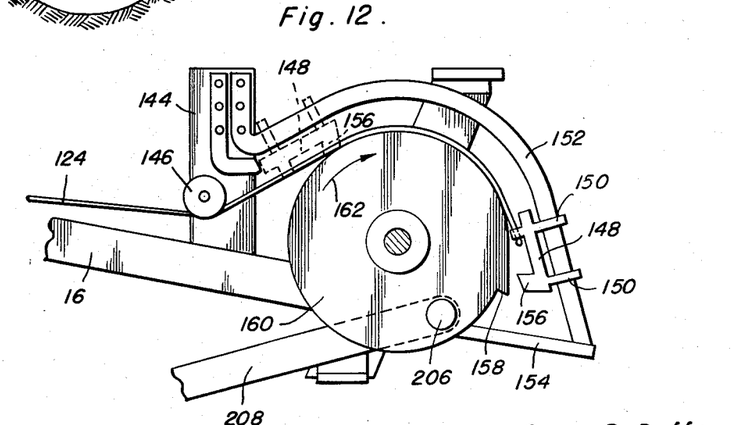
Figure 12 is an elevational detail view, illustrating the construction and certain features of the shovel stroke producing mechanism.

The cable 124, as will be more readily apparent from a study of Figures 4, 5, and 6, is then entrained over a pair of guide pulleys 140 and 142 and thence extends rearwardly of the machine over a further guide pulley 146, see Figure 12, suitably carried by a bracket 144 mounted upon and extending upwardly of the top bar 16. The end of this cable is then secured to a cable hook 148 having a pair of retaining and guiding members 150 which are slidable upon a curved cable hook guide 152 suitably mounted upon the bracket 144 and upon an extension 154 of the top bar 16. This cable hook 148 has a notch or latch portion 156 which is engageable by a spur or cam nose 158 formed on the periphery of an actuator wheel 160. It will thus be seen that as the actuator wheel rotates, in the direction indicated by the arrow 162 in Figure 12, the cam spur 158 will engage the notched portion 156 of the hook 148 when the latter is in the dotted line position, and then throughout substantially ninety degrees of rotation of the actuator wheel 160 will cause an arcuate movement of the cable hook 148, until the full line position of Figure 12 is reached, at which time the divergency of the paths of movement of the spur 158 and the notch 156 will cause a disengagement or release of the latter, whereupon the cable hook is free to slide back upon the cable hook guide to its original dotted line position. Thus, one reciprocation is imparted to the cable 124 throughout each rotation of the actuator wheel 160.

Referring now more especially to Figures 3 and 11, it will be seen that there is provided an actuator spindle 164 which is suitably journaled between the rear uprights 14 and 20, and which has one end extending beyond the upright 14 to receive rigidly thereon the above mentioned actuator wheel 160. Loosely surrounding the spindle 164 is an actuator sleeve 166 which has one end screw threadedly engaging the hub portion 168 forming part of a claw clutch which is splined to the spindle as at 169 for sliding movement but non-rotatable movement thereon. This hub portion 168 carries claw teeth 170 which are engageable with corresponding claw teeth 172 carried by a gear 174 whose hub is loosely and rotatably received upon the spindle 164, this gear having an annular groove 178 in its hub for engagement by an annular retaining member 180 carried by the support 14, whereby the gear is rotatably but non-slidably positioned upon the spindle 164.

The gear 174 is constantly in mesh with a driving pinion 176 which is keyed or otherwise secured to the actuator shaft 52.

In the other end of the sleeve 166 is fixedly secured an abutment collar or sleeve 182, which provides a seat for one end of a clutch compression spring 184. A bushing 186 is suitably positioned in a bearing aperture in the support 20 and journals the spindle 164 therein, the end of this bushing constituting a spring abutment for the other end of the compression spring 184.

Surrounding the sleeve 166 and secured thereto is a spindle sleeve brake disk 188, while a similar stationary brake plate 190 having a brake facing or lining 192 is rigidly attached to and carried by the support 20.

As will be seen, the spring 184 thus urges the sleeve 166 toward its right-hand position as viewed in Figure 11, thereby urging the claw teeth 170 and 172 of the clutch member into engagement, at which time the brake disks 190 and 188 are spaced from each other. When, however, the sleeve is moved to the left, by a means to be later described, the clutch teeth 170 and 172 are released, while the brake disks 188 and 190 are engaged. Since the sleeve 166 is splined to the spindle 164, it will be evident that the spindle is selectively placed in driving engagement with the actuator shaft gear 176 and the driving sprocket 58 previously mentioned, or is disengaged from this driving means and is prevented from rotating by engagement of the two brake disks.

Referring now to Figure 3, it will be seen that the spindle sleeve 166 and the spindle brake disk 188 are provided with a cam member 194 having a beveled cam lobe or nose 196, which is engageable with the end of a cam actuating finger 198 when the latter is moved up into the path of travel of the cam nose 196. This actuator finger 198 is carried by a lever 200 journaled as by a pin 197 in Figure 3 and is operated either to actuate or to stop dependent mechanism by knob handle 199 in Figure 3. The pin 197 is carried by the vertical portion 203 of supporting bracket 202 rigidly fastened to upright 20 as by its leg 204.

It will be understood that when the lever 200 is moved about its fulcrum point 197 toward the sleeve 166 by its handle 199, the actuator finger 198 thereof is disposed into the path of travel of the sloping cam nose 196. Accordingly, upon engagement of the nose 196 with the end of the finger 198, the cam and consequently the sleeve 166 are urged to the left, against the opposition of the compression spring 184, thereby engaging the brake disks 188 and 190 and disengaging the clutch teeth 170 and 172. Accordingly, the actuator spindle which is keyed to the sleeve is thereby braked and the mechanism associated therewith is prevented from operating; while when the clutch lever 200 is moved away from the above mentioned position, disengaging the clutch finger 198 from the cam lobe 196, the compression spring moves the sleeve to the right, releasing the brake and again establishing the clutch driving engagement with the intermediate spindle 52 to cause operation of those members driven by the actuator spindle 164.

As will be seen by reference to Figure 3, the actuator wheel 160 is provided with an actuator crank 205 which, as shown in the other figures of the drawings, is pivotally connected to one end of the actuator rod 208 whose other end is pivoted, as at 210 in Figure 10, to the lower end of the actuator arm. The radii of rotation of the crank pin 206 and the pivoted end 210 of the actuator arm 96 are such that upon rotation of the crank pin 206, the arm 96 is caused to have an oscillating motion. Thus, as the actuator spindle 164 is rotated under control of the clutch as above mentioned, an oscillating motion is imparted to the arm 96 and through the friction drive between the members 94 and 92 produces an oscillation of the actuator sleeve 70, thereby causing an oscillation in the vertical plane of the shovel boom mechanism including the upper and lower members 80 and 82, and the shovel attached thereto.

This vertical oscillation of the boom results in the imparting of a vertical digging movement to the shovel carried thereby. At the same time, and in properly timed relation thereto, the actuator wheel, by means of its cam or spur 158 and intermittent engagement with the cable latch 156, imparts a reciprocating motion to the cable 124, which in turn causes a swinging movement of the shovel during its above mentioned vertical reciprocation. This combination of the swinging movement of the shovel caused by the cable and the vertical reciprocating movement of the shovel caused by the reciprocation of the boom results in a compound motion indicated by the dotted lines in Figures 1 and 2, whereby the shovel has a downward stroke indicated by the portion 212 of the dotted lines which is caused by the reciprocation of the boom, and a rearward or dirt-throwing portion, indicated at 214, which is caused by the reciprocation of the cable 124. This latter movement causes the shovel handle to move suddenly to the rear, until the bumper spring is engaged, thus suddenly arresting the rearward movement of the handle and causing the dirt carried by the shovel to be thrown into the open front end of the receptacle 26. The engagement of the shovel handle with the resilient abutment spring 132 slightly compresses the latter, giving a forward throw to the shovel, and the spring, together with the continuous resistance of the bow spring 136 occurring during the upward part of the vertical reciprocation of the shovel, causes the shovel to follow the dotted line path indicated at 216, and whereby the shovel is returned to its original position.

Shovel traverse mechanism

It is an important and essential feature of this invention to provide automatic means for causing the automatically digging shovel to have a lateral or traverse movement across the face of the excavation being dug. For this purpose, the supporting boom is moved in a plane perpendicular to the vertical plane upon the trunnions 74 and 76 whereby the shovel gradually progresses from one side to the other of the face of the excavation. For this purpose, the following automatically operated mechanism is provided.

As shown best in Figure 4, the boom is provided with oppositely disposed, laterally positioned lugs 218 and 220, which are arcuately shaped about the axis of the trunnions 74 and 76 as a center. As shown in Figures 1 and 2, these lugs are carried by a vertical reinforcing member 222 which is secured between the upper and lower boom members 80 and 82. A pair of tension springs 224 are each connected at one extremity to one of the lugs 218 and 220 and at their other extremities to a boom swinging cable to be now described.

Figure 15:
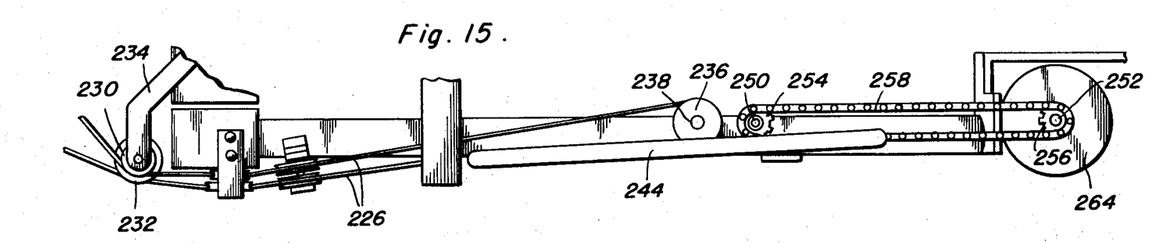
Figure 15 is a fragmentary top plan view of a portion of the shovel traversing or lateral swinging mechanism of the invention.
Figures 16, 17:
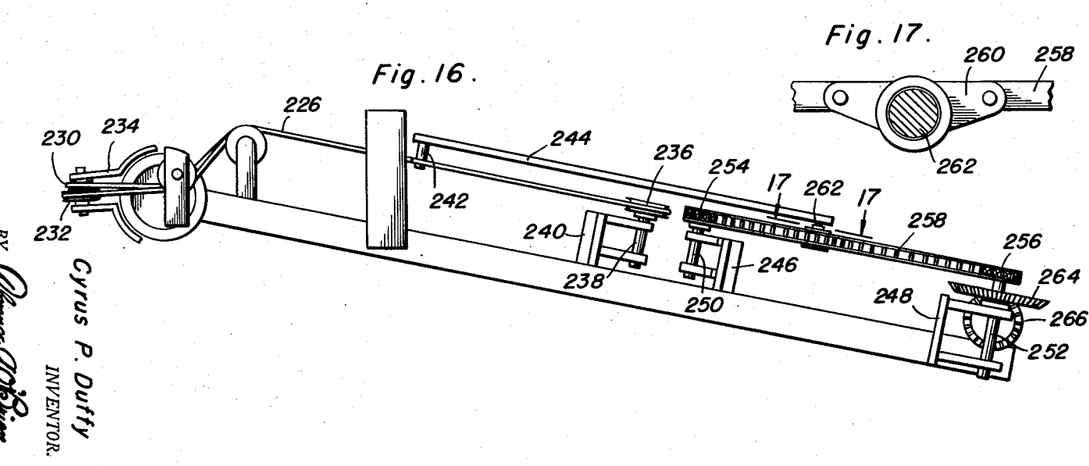
Figure 16 is a side elevational view of the mechanism shown in Figure 15.
Figure 17 is a vertical longitudinal sectional detail view taken substantially upon the plane of section line 17—17 of Figure 16.

A flexible cable 226 has its two extremities secured to the outer ends of the two springs 224, this cable being entrained over a guide pulley 228 at the right-hand side of Figure 4, and over a pair of guide pulleys 230 and 232, see Figure 15, which are supported by a suitable bracket 234 carried in any suitable manner by the framework of the machine, the flexible cable then passing over further guide pulleys and about an end pulley 236, see Fig. 16, mounted on a spindle 238 carried by a bracket 240. Secured to one flight of the cable 226 is a downwardly extending pin 242 carried by one end of a reciprocating connecting rod 244. It will thus be seen that as the rod 244 is reciprocated, the pin 242 will cause a reciprocating movement of the flexible cable 226, thereby resulting in an oscillating or traverse movement of the boom, to successively position the shovel across the entire lateral face of the cut of the excavation.

As will be clearly apparent from Figures 15 and 16 and in further conjunction with Figure 2, a pair of supports 246 and 248 are mounted upon the top bar 22 with the support 240, the support 246 journaling a spindle 250 while the support 248 rotatably carries the spindle 252. The spindles 250 and 252 at their upper ends are provided with sprocket gears 254 and 256 respectively, about which is entrained a sprocket chain 258 which, as shown in Figure 17, has a link 260 from which rises a pintle or trunnion 262 which is pivotally connected to the other end of the connecting rod 244 for reciprocation of the same.

It will thus be seen that as the sprocket chain 258 is slowly rotated, by a means to be subsequently set forth, the connecting rod 244 is slowly reciprocated, and the pin 242 thereof causes a corresponding reciprocation of the flexible cable 226 as above set forth.

The spindle 252 is further provided with a bevel gear 264 which is constantly in mesh with a corresponding bevel gear 266 carried by the actuating spindle 164, as will be apparent from Figures 3 and 11. Thus, as the actuating spindle is rotated, the above mentioned excavating strokes are imparted to the shovel, and simultaneously a slow lateral swinging or traverse movement is imparted to the boom to cause the successive strokes of the shovel to move evenly across the face of the cut and back again during operation of the device. At the same time, upon cessation of the operation strokes of the shovel, the traverse movement is likewise halted.

*Shovel elevating mechanism*

Another essential feature of this invention resides in providing mechanism for elevating or lowering the boom and thereby to cause the shovel to excavate above or below a horizontal plane whereby the device may be employed to dig up or down inclines or slopes, and this during the above mentioned traverse movement of the mechanism, and independently thereof. For an understanding of this mechanism and its operation, attention is now directed to Figures 2, 5–7, and also to Figures 8 and 9.

Suitably mounted upon the rear post 20 is a supporting bracket 268 within which is rotatably but non-slidably journaled an elevating crank 270. The end of this crank is flexibly but non-rotatably secured to an elevator screw 272 which is telescopingly and screw threadedly received in an elevator sleeve 274 whose other extremity is provided with a pin 276 which is slidably movable in an arcuate slot 278 formed in an enlarged headed portion 280 at the end of the above mentioned elevator arm 97 rigidly attached to the actuator tube 70. The function of the pin 276 is to provide a stop or limit to the oscillation of the elevator arm 97 and hence of the actuator sleeve 70 rigidly attached thereto, and to thus, by means of the screw threaded adjustment of the screw 272 in the sleeve 274, regulate the upper and lower extremes of the shovel position during its vertical oscillation.

As will be evident, once the elevator screw and the elevator pin 276 positioned thereby have been set for a given adjustment, the boom oscillates in a vertical plane limited only by the extent of movement of the slot 278 about the stationary pin 276. Obviously, if the elevator screw is telescoped into the sleeve 274, in the manner shown in Figure 6, the upward and downward extremes of vertical reciprocation of the boom are lowered to their minimum, while if the elevator screw is moved outwardly with respect to the elevator sleeve as in Figure 5, the limits of vertical movement of the boom are elevated to their maximum value, as shown in Figure 5. In the former adjustment, the shovel is set for excavating a downward incline, while in the latter position the apparatus is adjusted for excavating a cut at a higher elevation whereby the machine may be adjusted to make an upwardly inclined excavating slope.

The elevating mechanism is adjustable during the operation of the shovel, and the latter automatically adjusts itself to the manual setting of the elevator pin 276.

The operation of the elevating mechanism and of the boom oscillating mechanism is as follows: When the elevator screw and sleeve are in their most extended position, as shown in Figure 5, the elevator pin 276 is disposed in its outermost position as shown in Figure 5, and the position of the elevator sleeve 274 and pin 276 are as shown in Figures 8 and 9 in full lines. Therefore, during the oscillation of the actuator sleeve 70 by means of the actuator arm 96 and connecting rod 208, the sleeve is free to oscillate, within the movement imparted by the oscillating arm 96, and within the limits interposed by the stationary pin 276 in the relatively oscillating arcuate slot 278, the uppermost limit of oscillation of the boom, and of the arm 97 being indicated at 97a in Figure 9 and at 97 in Figure 8. As will be evident, in this position of adjustment, the range of vertical movement of the boom has been elevated to its maximum.

Assume now that the elevating screw and sleeve have been telescoped into their shortest length, as shown in Figure 6, and that the elevator sleeve has assumed the position shown at 274 and the elevator arm has assumed the position shown at 97 in Figure 9. As will be evident, the stationary elevator pin 276 has now been shifted in a clockwise direction relative to the original position, and since the arcuate slot 278 must oscillate about the stationary pin, the movement of the slot has likewise been shifted in a clockwise direction, to that indicated in full lines at 278 in Figure 9. Alternative positions of the actuator rod, elevator arm and actuator arm are shown in dotted lines at 208A, 97A and 96A in Figures 8 and 9.

It will thus be seen that when the elevator pin 276 has been shifted, on the next operating stroke, regardless of whether up or down, the end of the slot 278 will engage the pin 276, preventing any further movement of the elevator arm 97, and therefore of the actuator tube 76. Consequently, the boom will cease its vertical travel, and the necessarily continued oscillatory movement of the actuator arm 96 will result in slippage between brake lining 98 interposed between the brake disk 92 and the brake band 94. This slippage will continue until the actuator arm 96 has completed its stroke. Upon the return movement of the actuator arm, it is obvious that the slot 278 is free to slide over the elevator pin 276, and accordingly the actuator tube 70 will be moved throughout its complete path of oscillation and will continue to move throughout its new position until the elevator pin is again re-set. It will thus be seen that when the elevator pin has been set to a new position, the next stroke of the actuator arm and actuator tube will cause a slippage in the friction brake that drives the actuator tube, whereby the range of stroke of the boom will be immediately adjusted for the predetermined number of degrees of vertical oscillation about the stationary elevator pin.

*Overload safety devices*

In order to enhance the efficiency of operation and prolong the life of the apparatus, various overload safety features are incorporated into the mechanism of the device to insure that no injury will be done to the apparatus when an obstruction such as a boulder or the like is encountered which prevents the shovel from making its complete stroke; or when some other obstruction is encountered which prevents the traverse movement of the boom. The first of these safety features includes the previously mentioned friction slide which is movable upon the friction bar 108, and to which the shovel actuating cable 124 is terminally connected. The frictional resistance of the slide to movement upon the friction bar 108 is such as to constitute a fixed anchor for the end of the cable 124 when the device is operating within the predetermined capacity of the machine. However, when an overload is encountered, such as when the shovel strikes an obstacle, the continually increased strain upon the moving cable 124 will cause a sliding of the slide upon the friction bar 108, against the resistance of the frictional force thereof, as well as against the resistance of the tension springs 120, whereby the movement of the cable is permitted without further movement of the shovel. Upon the release of the operating force applied to the cable 124 by means of the previously mentioned actuator wheel cam 158 and cable hook 148, the springs 120 serve to return the slide to its original position, as shown in Figure 2, despite the frictional engagement of the latter upon the friction bar 108, thereby releasing the shovel and returning the same to its original position, as shown in the uppermost of the dotted line positions of Figures 1 and 2. Upon the next actuation of the shovel cable 124, the shovel again makes its downward stroke which, if the obstruction is still present, is again interrupted without damage to the mechanism. Eventually, of course, the continued digging action of the shovel will either dislodge, undermine, or due to the traverse movement of the mechanism, work around the obstacle, whereupon the shovel will resume its full stroke. It will thus be seen that by this means, the rapid digging action of the shovel is uninterrupted and unimpaired by the encountering of an obstacle, except as to the limitation of the effective stroke of the shovel. Further, the shovel is thus effective to extricate itself from the obstacle encountered, whereby it may resume digging to either undermine or pass the obstruction.

It will be further noted that the friction clutch driving connection between the actuator arm 96 and the actuator tube 76 will cause a slippage which will arrest further downward movement of the boom and shovel when the shovel encounters any obstacle on upward and downward movement even though the actuator arm continues its oscillation in response to contained rotation of the actuator spindle. As pointed out hereinbefore, the relative displacement or shortening of the effective stroke of the boom with reference to the stationary elevator pin 276 is immediately compensated for and adjusted by the next cycle of operation of the associated members.

Further, any obstruction encountered by the machine in making its lateral traverse movement across the face of the cut is to some extent cushioned by reason of the springs 224. Moreover, the yielding action of springs 224 permits the upward and downward movement of the boom during the digging stroke, without breaking the traverse cable 226, these springs giving the necessary yielding action which is required by the angular movement of the ends of the cable 226.

As will be apparent, the intermediate shaft 52 supplies the entire power for the machine, and by proper manipulation of the foot pedal lever 58, reverse lever 56, and gearing 54, is effective to simultaneously and automatically either advance the apparatus or move the same backwardly, while automatically, as permitted by the control clutch lever 202, to cause the vertical oscillation of the boom by means of the connecting rod 208 and actuator arm 96, while simultaneously causing the shoveling action by the cable 124 through the agency of the actuator wheel cam 158 and the cable hook 148, and at the same time causing the traversing movement of the mechanism by means of the gearing 264 and 266, and the sprocket chain 268 in driving engagement with the traversing cable 226.

From the foregoing, the principles of operation of the device will be readily understood and the many advantages attained thereby will be obviously apparent. Accordingly, further explanation is believed to be unnecessary.

However, since numerous modifications will readily occur to those skilled in the art after a consideration of the foregoing specification and accompanying drawings, it is not desired to limit the invention to the exact construction shown and described, but all suitable modifications and equivalents may be resorted to falling within the scope of the appended claims.

Having thus disclosed and described the invention, what is claimed as new is as follows:

1. In an excavating machine, a boom, a shovel comprising a handle having a spade-like blade at its lower end, a pivot connecting the upper end of said shovel handle to an end of said boom, a first means for vertically oscillating said boom about a stationary horizontal axis to cause vertical digging strokes by said shovel and a second means for independently oscillating said shovel in a vertical plane about said pivot to cause removal of dirt by said shovel, and a common means for driving said first and second means in timed relation, a bumper spring mounted on said boom and constituting a resilient abutment for engagement with said shovel handle to abruptly limit the independent oscillation thereof and cause a discharge of of its contents.

2. In an excavating machine, a boom, a shovel, a pivot connecting said shovel to said boom, a first means for vertically oscillating said boom about a stationary horizontal axis to cause digging by said shovel and a second means for independently oscillating said shovel in a vertical plane about said pivot to cause removal of dirt by said shovel, and a common means for driving said first and second means in timed relation, a yielding connection in said second means to prevent the transfer of excessive loads from said shovel to said second means, said second means including a flexible cable connected to said common means, said shovel and an adjustable friction slide.

3. In an excavating machine, a boom, a shovel, a pivot connecting said shovel to said boom, a first means for vertically oscillating said boom about a stationary horizontal axis to cause digging by said shovel and a second means for independently oscillating said shovel in a vertical plane about said pivot to cause removal of dirt by said shovel and a common means for driving said first and second means in timed relation, said first means including an actuator tube mounted for oscillation about a horizontal axis, said boom being mounted on said actuator tube, an actuator rod connected to said common means and a yieldable coupling between said actuator rod and said actuator tube.

4. The combination of claim 3 wherein said yieldable coupling includes a friction disk on said actuator tube, a friction band connected to said actuator rod and frictionally embracing said friction disk and means for adjusting the frictional grip of said friction band on said friction disk.

5. In an excavating machine, a boom, a shovel, a pivot connecting said shovel to said boom, a first means for vertically oscillating said boom about a stationary horizontal axis to cause digging by said shovel and a second means for independently oscillating said shovel in a vertical plane about said pivot to cause removal of dirt by said shovel and a common means for driving said first and second means in timed relation, said first means including an actuator tube mounted for oscillation about a horizontal axis, said boom being mounted on said actuator tube, an actuator rod connected to said common means and a yieldable coupling between said actuator rod and said actuator tube, said actuator tube having oppositely disposed radial trunnions, said boom being mounted on said trunnions for movement in a plane perpendicular to the vertical plane of oscillation of the boom.

6. The combination of claim 5 including traversing means for positively moving said boom in said perpendicular plane, said traversing means being driven by said common means.

7. The combination of claim 6 including elevating means for vertically adjusting the upper and lower limits of the vertical oscillation of said boom.

8. The combination of claim 7 wherein said elevating means includes a telescoping elevator sleeve and screw, a stop pin carried by said elevator sleeve, an elevator arm rigid with said actuator tube and a guide slot receiving said elevator pin.

9. In an excavating machine, a boom, a shovel, a pivot connecting the upper end of said shovel to said boom, a first means for vertically oscillating said boom about a stationary horizontal axis to cause digging by said shovel in a vertical plane about said pivot to cause removal of dirt by said shovel, and a common means for driving said first and second means in timed relation, elevating means for vertically adjusting the upper and lower limits of the vertical oscillation of said boom, said elevator means including an elevator arm having a guide slot and rigidly secured to said boom, a stop pin movable in said slot, manual means for adjusting said stop pin to vary the limits of arcuate movement of said slot and boom, and a yieldable coupling between said common means and said boom.

10. In an excavating machine, an actuating tube rotatable about a horizontal axis, a boom carrying a separately movable shovel journaled on said actuator tube for movement in a vertical plane therewith and for independent movement in a plane perpendicular to said vertical plane, a power shaft, a first means including a yieldable coupling for connecting said power shaft to said actuator tube, a traversing means connected to said power shaft and to said boom for moving the latter in said perpendicular plane.

11. The combination of claim 10 wherein said traversing means includes a cable entrained over pulleys and secured to opposite sides of said boom, a connecting rod terminally connected to said cable and to said power shaft.

12. The combination of claim 11 including an endless sprocket chain, a driving connection between said sprocket chain and said power shaft, said connecting rod having one end journaled on said sprocket chain.

13. In an excavating machine, a boom, a shovel, a pivot connecting said shovel to said boom, a first means for vertically oscillating said boom about a stationary horizontal axis to cause digging by said shovel and a second means for independently oscillating said shovel in a vertical plane about said pivot to cause removal of dirt by said shovel and a common means for driving said first and second means in timed relation, said second means including a cable terminally connected to an anchor and to an actuator, said cable being connected intermediate its ends to said shovel, a guide, said actuator being slidably secured to said guide, a hook on said actuator and a rotatable cam lobe intermittently engaging and releasing said hook, said cam lobe being driven by said common means.

14. The combination of claim 13 wherein said guide has an arcuate portion concentric with the axis of rotation of said cam lobe, said guide having an end portion tangent to the arcuate path of said cam lobe for causing disengagement of said hook therefrom.

15. The combination of claim 14 including spring means attached to said boom and shovel for urging said shovel into a predetermined position and for tensioning said cable to position said hook into position for engagement by said cam lobe.

16. In an excavating machine having a boom and a shovel pivoted thereto, a first means for imparting vertical oscillation to said boom, a second means for imparting independent vertical oscillation to said shovel, a traversing means for imparting oscillation to said boom and shovel in a plane perpendicular to the vertical plane of boom oscillation, a common driving means for actuating said first, second and traversing means in timed relation to each other and manual means operable independently and during operation of any of the preceding means for adjusting the upper and lower limits of the vertical oscillation of said boom, said common driving means including an actuator spindle, a driving sleeve keyed to and slidable on said spindle, a source of power, a clutch at one end of said sleeve for detachable connection to said source of power, a brake at the other end of said sleeve and means for selectively and alternatively applying said brake and engaging said clutch.

17. In an excavating machine, a boom, a shovel, a pivot connecting said shovel to said boom, a first means for vertically oscillating said boom about a stationary horizontal axis to cause digging by said shovel and a second means for independently oscillating said shovel in a vertical plane about said pivot to cause removal of dirt by said shovel and a common means for driving said first and second means in timed relation, said first means including an actuator tube mounted for oscillation about a horizontal axis, said boom being mounted on said actuator tube, an actuator rod connected to said common means and a yieldable coupling between said actuator rod and said actuator tube, a yielding connection in said second means to prevent the transfer of excessive loads from said shovel to said second means.

18. The combination of claim 17, said yielding connection including an adjustable friction slide, said second means including a flexible cable connected to said common means, said shovel and said adjustable friction slide.

19. In an excavating machine, a boom, a shovel, a pivot connecting said shovel to said boom, a means for oscillating said shovel in a vertical plane about said pivot to cause removal of dirt by said shovel, a bumper spring constituting a resilient abutment for engagement by said shovel to abruptly limit the independent oscillation thereof and cause a discharge of its contents, said shovel oscillating means including an actuator, a cable connecting said shovel to said actuator; a yieldable anchor connected to said cable to prevent the transfer of excessive loads from said shovel to said shovel oscillating means.

20. The combination of claim 19, wherein said cable is terminally connected to said actuator and to said anchor, said cable being connected intermediate its ends to said shovel.

21. In an excavating machine, a boom, a shovel, a pivot connecting said shovel to said boom, a means for oscillating said shovel in a vertical plane about said pivot to cause digging and throwing of dirt by said shovel, said means including a cable attached to said shovel, an intermittent actuator for said shovel connected to said cable for actuating said shovel at spaced time intervals, a driving means connected to said actuator, said intermittent actuator including a guide, said actuator being slidably secured to said guide, a hook on said actuator, and a rotatable cam lobe intermittently engaging and releasing said hook.

22. The combination of claim 21, wherein said guide has an arcuate portion concentric with the axis of rotation of said cam lobe, said guide having an end portion tangent to the arcuate path of said cam lobe for causing disengagement of said hook therefrom.

23. A machine, a support on said machine, a boom pivotally mounted on said support, a first means for vertically oscillating said boom, a traversing means for imparting oscillation to said boom in a plane angularly disposed to the plane of vertical oscillation, common means for operating said first and traversing means in timed relation to each other, said common means including an actuator spindle, a driving sleeve keyed to and slidable on said spindle, a source of power, a clutch at one end of said sleeve for detachable connection to said source of power, a brake at the other end of said sleeve, and means for selectively and alternatively applying said brake and disengaging said clutch to stop said machine.

24. In an excavating machine, a boom, a shovel, a pivot connecting said shovel to said boom, a first means for vertically oscillating said boom about a stationary horizontal axis to cause digging by said shovel and a second means for independently oscillating said shovel in a vertical plane about said pivot to cause removal of dirt by said shovel and a common means for driving said first and second means in timed relation, said common means including an actuator spindle, a driving sleeve keyed to and slidable on said spindle, a source of power, a clutch at one end of said sleeve for detachable connection to said source of power, a brake at the other end of said sleeve, and means for selectively and alternatively applying said brake and disengaging said clutch.

25. A machine including a support, a boom pivotally mounted on said support, a shovel pivotally attached to said boom, means attached to said shovel for vertically oscillating said shovel, traversing means attached to said boom for oscillating said boom in a plane inclined to the vertical plane of oscillation of the shovel, common means for actuating said shovel oscillating means and said traversing means in timed relation to each other, said common means including an actuator spindle, a driving sleeve keyed to and slidable on said spindle, a source of power, a clutch at one end of said sleeve for detachable connection to said source of power, a brake at the other end of said sleeve, and means for selectively and alternatively applying said brake and disengaging said clutch.

26. In an excavating machine, a horizontal disposed boom having forward and rear ends, means mounting the rear end of said boom for vertical oscillation about a stationary horizontal axis, a shovel having a vertical handle and a spade-like blade rigidly secured to the lower end thereof, means pivotally connecting the upper end of the shovel handle to the forward end of said boom for oscillation in a vertical plane, a first means for imparting vertical oscillation to said boom and thereby imparting vertical digging strokes to said shovel handle and blade, a second means for imparting oscillation to said shovel about its pivot means, said second means being interconnected to said first means and timed relative thereto whereby pivotal swinging movement of said shovel is initiated substantially upon the completion of the vertical digging stroke of the shovel as caused by the vertical oscillation of said boom.

27. The combination of claim 26, wherein said second means includes a cable attached to said shovel, means intermittently actuating said cable to impart swinging movement to said shovel.

References Cited in the file of this patent

UNITED STATES PATENTS

| Number | Name | Date |
|---|---|---|
| Re. 23,166 | Owen | Nov. 8, 1949 |
| 817,662 | Pearson | Apr. 10, 1906 |
| 852,919 | Whittemore | May 7, 1907 |
| 1,054,900 | Brunelle | Mar. 4, 1913 |
| 1,485,198 | Pugh | Feb. 26, 1924 |
| 1,503,813 | Burke | Aug. 5, 1924 |
| 1,539,622 | Amundson | May 26, 1925 |
| 1,667,381 | Hetlesater | Apr. 24, 1928 |
| 1,768,657 | Baker | July 1, 1930 |
| 1,827,541 | Opperman | Oct. 13, 1931 |
| 1,896,293 | Downie | Feb. 7, 1933 |
| 1,939,289 | Baker | Dec. 12, 1933 |
| 1,995,629 | Baker | Mar. 26, 1935 |
| 2,059,660 | Sheets | Nov. 3, 1936 |
| 2,119,139 | Owen et al. | May 31, 1938 |
| 2,148,171 | Paris et al. | Feb. 21, 1939 |
| 2,205,732 | Royle | June 25, 1940 |
| 2,394,830 | Woodin | Feb. 12, 1946 |
| 2,506,759 | Wommer | May 9, 1950 |